United States Patent
Lakshmikanthan et al.

(10) Patent No.: US 10,158,566 B2
(45) Date of Patent: Dec. 18, 2018

(54) SHORTEST PATH BRIDGE WITH MPLS LABELS

(71) Applicant: Telefonaktiebolaget L M Ericsson (publ), Stockholm (SE)

(72) Inventors: Ramanathan Lakshmikanthan, Santa Clara, CA (US); Albert Jining Tian, Cupertino, CA (US); Wenhu Lu, San Jose, CA (US); Evgeny Tantsura, Palo Alto, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 326 days.

(21) Appl. No.: 14/664,141

(22) Filed: Mar. 20, 2015

(65) Prior Publication Data

US 2016/0277291 A1 Sep. 22, 2016

(51) Int. Cl.
*H04L 12/723* (2013.01)
*H04L 12/46* (2006.01)
*H04L 12/721* (2013.01)

(52) U.S. Cl.
CPC .......... *H04L 45/507* (2013.01); *H04L 12/465* (2013.01); *H04L 45/12* (2013.01)

(58) Field of Classification Search
None
See application file for complete search history.

(56) References Cited

U.S. PATENT DOCUMENTS

| | | | |
|---|---|---|---|
| 6,665,273 B1* | 12/2003 | Goguen | H04L 45/00 370/252 |
| 8,295,291 B1 | 10/2012 | Ramanathan et al. | |
| 2008/0172497 A1* | 7/2008 | Mohan | H04L 12/4616 709/249 |
| 2009/0041038 A1 | 2/2009 | Martini et al. | |
| 2010/0124225 A1* | 5/2010 | Fedyk | H04L 45/02 370/390 |
| 2010/0208593 A1* | 8/2010 | Soon | H04L 12/2859 370/242 |
| 2011/0286452 A1* | 11/2011 | Balus | H04L 12/4641 370/390 |
| 2014/0126422 A1* | 5/2014 | Bragg | H04L 12/462 370/255 |

(Continued)

OTHER PUBLICATIONS

IEEE 802.1ad-2005: IEEE Standard for Local and Metropolitan Area Networks—Virtual Bridged Local Area Networks—Amendment 4: Provider Bridges, Institute of Electrical and Electronics Engineers, Inc., May 26, 2006, 74 pages.

(Continued)

*Primary Examiner* — Maharishi V Khirodhar
*Assistant Examiner* — Angel T Brockman
(74) *Attorney, Agent, or Firm* — Sage Patent Group

(57) ABSTRACT

A method is implemented by a node for enabling shortest path bridging in a network that is scalable to support sixteen million virtual local area network (VLAN) identifiers using multiprotocol label switching (MPLS) encapsulation. The method comprises allocating a tunnel label using a distributed tunnel label allocation algorithm, allocating a source label using a distributed source label allocation algorithm, assigning a bridge instance a service label, and distributing the tunnel label, source label and service label to other nodes in the MPLS network.

13 Claims, 8 Drawing Sheets

(56) References Cited

U.S. PATENT DOCUMENTS

2015/0124622 A1\* 5/2015 Kovvali ............ H04W 28/0215
370/236
2015/0188780 A1\* 7/2015 Spieser ............... H04L 41/5009
370/252

OTHER PUBLICATIONS

IEEE 802.1ah-2008: IEEE Standard for Local and Metropolitan Area Networks—Virtual Bridged Local Area Networks—Amendment 7: Provider Backbone Bridges, Institute of Electrical and Electronics Engineers, Inc., Aug. 14, 2008, 121 pages.
IEEE P802.1aq/D3.0: IEEE Draft Standard for Local and Metropolitan Area Networks—Virtual Bridged Local Area Networks—Amendment 9: Shortest Path Bridging, Institute of Electrical and Electronics Engineers, Inc., Jun. 10, 2010, 246 pages.
IEEE 802.1aq-2012: IEEE Standard for Local and Metropolitan Area Networks—Media Access Control (MAC) Bridges and Virtual Bridged Local Area Networks—Amendment 20: Shortest Path Bridging, Institute of Electrical and Electronics Engineers, Inc., Jun. 29, 2012, 340 pages.
IEEE 802.1AX-2008: IEEE Standard for Local and Metropolitan Area Networks—Link Aggregation, Institute of Electrical and Electronics Engineers, Inc., Nov. 3, 2008, 162 pages.
IEEE 802.1Q-2011: IEEE Standard for Local and Metropolitan Area Networks—Media Access Control (MAC) Bridges and Virtual Bridge Local Area Networks, Institute of Electrical and Electronics Engineers, Inc., Aug. 31, 2011, 1365 pages.
International Standard ISO/IEC 10589:2002(E), Second Edition, Information technology—Telecommunications and information exchange between systems—Intermediate System to Intermediate System intra-domain routeing information exchange protocol for use in conjunction with the protocol for providing the connectionless-mode network service (ISO 8473), Nov. 15, 2002, 210 pages.
RFC 768: Postel, "User Datagram Protocol," Aug. 28, 1980, 3 pages, Network Working Group, Request for Comments: 768.
RFC 793: "Transmission Control Protocol, DARPA Internet Program Protocol Specification," Sep. 1981, 91 pages, Network Working Group, Request for Comments: 793.
RFC 1058: Hedrick, "Routing Information Protocol," Jun. 1988, 33 pages, Network Working Group, Request for Comments: 1058.
RFC 1142: Oran, "OSI IS-IS Intra-domain Routing Protocol," Feb. 1990, 157 pages, Network Working Group, Request for Comments: 1142.
RFC 1180: Socolofsky, et al., "A TCP/IP Tutorial," Jan. 1991, 28 pages, Network Working Group, Request for Comments: 1180.
RFC 2080: Malkin, et al., "RIPng for IPv6," Jan. 1997, 19 pages, Network Working Group, Request for Comments: 2080.
RFC 2205: Braden, et al., "Resource ReSerVation Protocol (RSVP)—Version 1 Functional Specification," Sep. 1997, 112 pages, Network Working Group, Request for Comments: 2205.
RFC 2210: Wroclawski, "The Use of RSVP with IETF Integrated Services," Sep. 1997, 33 pages, Network Working Group, Request for Comments: 2210.
RFC 2211: Wroclawski, "Specification of the Controlled-Load Network Element Service," Sep. 1997, 19 pages, Network Working Group, Request for Comments: 2211.
RFC 2212: Shenker, et al., "Specification of Guaranteed Quality of Service," Sep. 1997, 20 pages, Network Working Group, Request for Comments: 2212.
RFC 2328: Moy, "OSPF Version 2," Apr. 1998, 244 pages, Network Working Group, Request for Comments: 2328, The Internet Society.
RFC 2453: Malkin, "RIP Version 2," Nov. 1998, 39 pages, Network Working Group, Request for Comments: 2453, The Internet Society.
RFC 2460: Deering, et al., "Internet Protocol, Version 6 (IPv6) Specification," Dec. 1998, 39 pages, Network Working Group, Request for Comments: 2460, The Internet Society.

RFC 2474: Nichols, et al., "Definition of the Differentiated Services Field (DS Field) in the IPv4 and IPv6 Headers," Dec. 1998, 20 pages, Network Working Group, Request for Comments: 2474, The Internet Society.
RFC 2475: Blake, et al., "An Architecture for Differentiated Services, " Dec. 1998, 36 pages, Network Working Group, Request for Comments: 2475, The Internet Society.
RFC 2597: Heinanen, et al., "Assured Forwarding PHB Group," Jun. 1999, 11 pages, Network Working Group, Request for Comments; 2597, The Internet Society.
RFC 2675: Borman, et al., "IPv6 Jumbograms," Aug. 1999, 9 pages, Network Working Group, Request for Comments: 2675, The Internet Society.
RFC 2983: Black, "Differentiated Services and Tunnels," Oct. 2000, 14 pages, Network Working Group, Request for Comments: 2983, The Internet Society.
RFC 3086: Nichols, et al., "Definition of Differentiated Services Per Domain Behaviors and Rules for their Specification," Apr. 2001, 24 pages, Network Working Group, Request for Comments: 3086, The Internet Society.
RFC 3140: Black, et al., "Per Hop Behavior Identification Codes," Jun. 2001, 8 pages, Network Working Group, Request for Comments: 3140, The Internet Society.
RFC 3209: Awduche, et al., "RSVP-TE: Extensions to RSVP for LSP Tunnels," Dec. 2001, 61 Pages, Network Working Group, Request for Comments: 3209, The Internet Society.
RFC 3246: Davie, et al., "An Expedited Forwarding PHB (Per-Hop Behavior)," Mar. 2002, 16 pages, Network Working Group, Request for Comments: 3246, The Internet Society.
RFC 3247: Charny, et al., "Supplemental Information for the New Definition of the EF PHB (Expedited Forwarding Per-Hop Behavior)," Mar. 2002, 24 pages, Network Working Group, Request for Comments: 3247, The Internet Society.
RFC 3260: Grossman, "New Terminology and Clarifications for Diffserv," Apr. 2002, 10 pages, Network Working Group, Request for Comments: 3260, The Internet Society.
RFC 3289: Baker, et al., "Management Information Base for the Differentiated Services Architecture," May 2002, 116 pages, Network Working Group, Request for Comments: 3289, The Internet Society.
RFC 3290: Bernet, et al., "An Informal Management Model for Diffserv Routers," May 2002, 56 pages, Network Working Group, Request for Comments: 3290, The Internet Society.
RFC 3317: Chan, et al., "Differentiated Services Quality of Service Policy Information Base," Mar. 2003, 96 pages, Network Working Group, Request for Comments: 3317, The Internet Society.
RFC 3473: Berger, "Generalized Multi-Protocol Label Switching (GMPLS) Signaling Resource ReserVation Protocol-Traffic Engineering (RSVP-TE) Extensions," Jan. 2003, 42 pages, Network Working Group, Request for Comments: 3473, The Internet Society.
RFC 3936: Kompella, et al., "Procedures for Modifying the Resource reSerVation Protocol (RSVP)," Oct. 2004, 7 pages, Network Working Group, Request for Comments: 3936, The Internet Society.
RFC 4113: Fenner, et al., "Management Information Base for the User Datagram Protocol (UDP)," Jun. 2005, 19 pages, Network Working Group, Request for Comments: 4113, The Internet Society.
RFC 4271: Rekhter, et al., "A Border Gateway Protocol 4 (BGP-4)," Jan. 2006, 104 pages, Network Working Group, Request for Comments: 4271, The Internet Society.
RFC 4301: Kent, et al., "Security Architecture for the Internet Protocol," Dec. 2005, 101 pages, Network Working Group, Request for Comments: 4301, The Internet Society.
RFC 4309: Housley, et al., "Using Advanced Encryption Standard (AES) CCM Mode with IPsec Encapsulating Security Payload (ESP)," Dec. 2005, 13 pages, Network Working Group, Request for Comments: 4309, The Internet Society.
RFC 4364: Rosen, et al., "BGP/MPLS IP Virtual Private Networks (VPNs)," Feb. 2006, 47 pages, Network Working Group, Request for Comments: 4364, The Internet Society.
RFC 4495: Polk, et al., "A Resource Reservation Protocol (RSVP) Extension for the Reduction of Bandwidth of a Reservation Flow," May 2006, 21 pages, Network Working Group, Request for Comments: 4495, The Internet Society.

(56) References Cited

OTHER PUBLICATIONS

RFC 4558: Ali, et al., "Node-ID Based Resource Reservation Protocol (RSVP) Hello: A Clarification Statement," Jun. 2006, 7 pages, Network Working Group, Request for Comments: 4558, The Internet Society.

RFC 4594: Babiarz, et al., "Configuration Guidelines for DiffServ Service Classes," Aug. 2006, 57 pages, Network Working Group, Request for Comments: 4594, The Internet Society.

RFC 5036: Andersson, et al., "LDP Specification," Oct. 2007, 135 pages, Network Working Group, Request for Comments: 5036, The IETF Trust.

RFC 5340: Coltun, et al., "OSPF for IPv6," Jul. 2008, 94 pages, Network Working Group, Request for Comments: 5340, The IETF Trust.

RFC 5405: Eggert, et al., "Unicast UDP Usage Guidelines for Application Designers," Nov. 2008, 27 pages, Network Working Group, Request for Comments: 5405, IETF Trust and the persons identified as the document authors.

RFC 5865: Baker, et al., "A Differentiated Services Code Point (DSCP) for Capacity-Admitted Traffic," May 2010, 14 pages, Internet Engineering Task Force (IETF), Request for Comments: 5865, IETF Trust and the persons identified as the document authors.

RFC 6329: Fedyk, et al., "IS-IS Extensions Supporting IEEE 802.1aq Shortest Path Bridging," Apr. 2012, 38 pages, Internet Engineering Task Force (IETF), Request for Comments: 6329, IETF Trust and the persons identified as the document authors.

Previdi, et al., "IS-IS Extensions for Segment Routing, draft-ietf-isis-segment-routing-extensions-03," IS-IS for IP Internets, Internet-Draft, Internet Engineering Task Force (IETF), Oct. 25, 2014, 33 pages.

Previdi, et al., "IS-IS Extensions for Segment Routing, draft-previdi-isis-segment-routing-extensions-05." IS-IS for IP Internets, Internet-Draft, Internet Engineering Task Force (IETF), Feb. 13, 2014, 27 pages.

\* cited by examiner

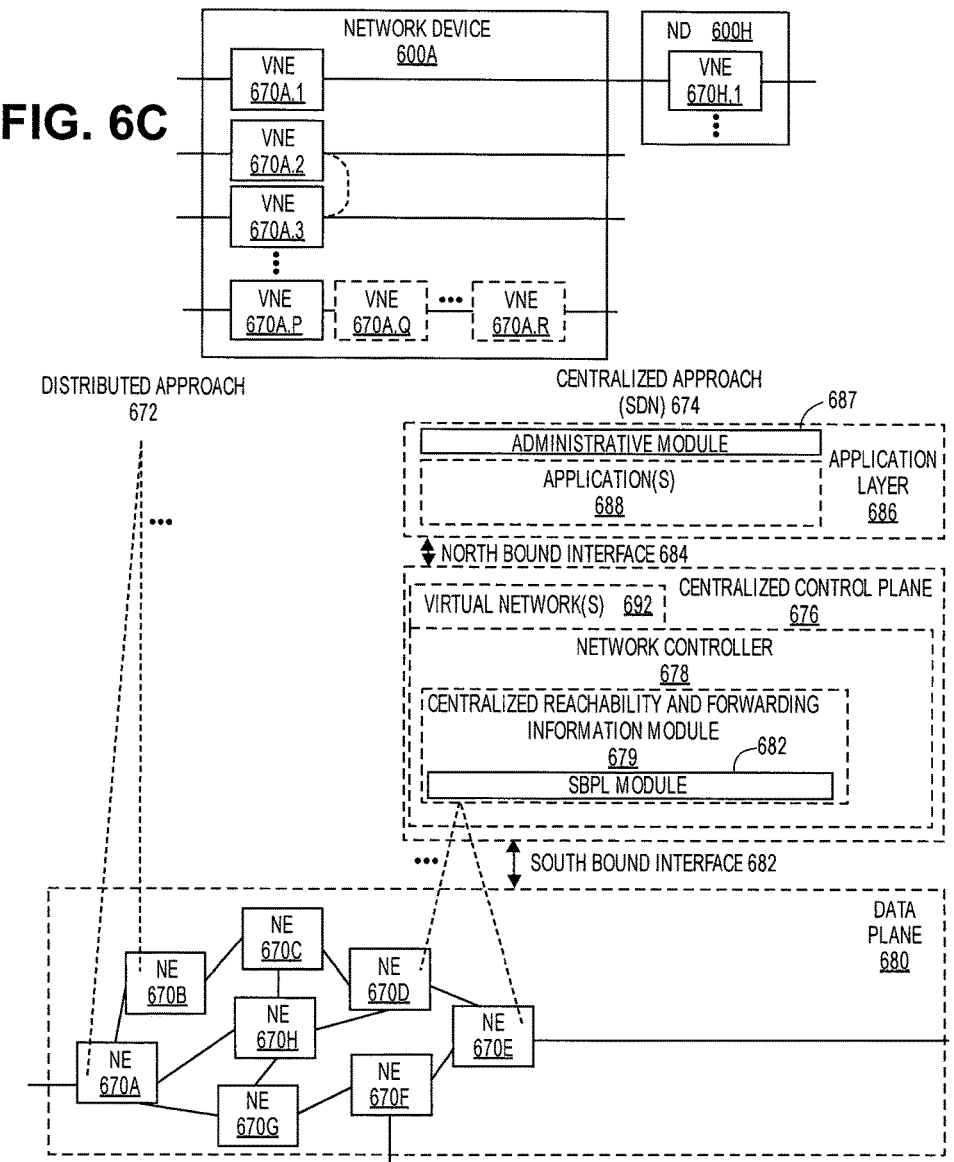
FIG. 6C
FIG. 6D
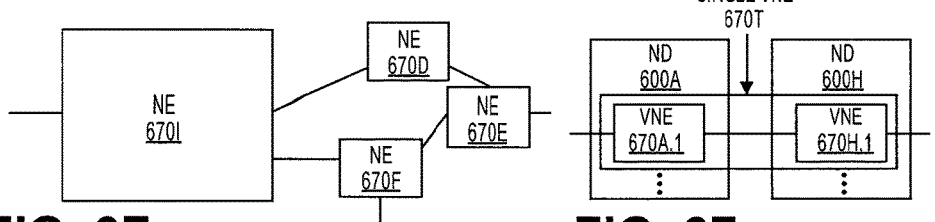
FIG. 6E
FIG. 6F

SHORTEST PATH BRIDGE WITH MPLS LABELS

FIELD

Embodiments of the invention relate to providing establishing shortest path bridging in a network. Specifically, the embodiments relate to a method and system implemented by nodes in the network to enable scalable implementation of shortest path bridging without hardware changes to network device using media access control (MAC) in multi-protocol label switching encapsulation.

BACKGROUND

Shortest Path Bridging (SPB), as specified in the Institute of Electrical and Electronics Engineers (IEEE) 801.1aq standard, is a computer networking technology intended to simplify the creation and configuration of networks, while enabling multipath routing of data traffic across the networks.

Shortest Path Bridging is the replacement for the older Spanning Tree Protocols (STP) (defined by IEEE 802.1D STP, IEEE 802.1wRSTP, IEEE 802.1s MSTP) that is used to determine paths for forwarding data traffic across segmented networks joined by a set of bridges. This system enabled layer 3 routing of data traffic over a layer 2 network like Ethernet or token ring. STP permitted only a single path toward a root bridge and blocked any redundant paths that could result in a Layer 2 loop. SPB allows all paths to be active with multiple equal cost paths, and provides support for much larger Layer 2 topologies (up to 16 million compared to the traditional 802.1Q WAN limit of 4,096). SPB also supports fast convergence times, and improves the efficiency of the mesh topologies through increased bandwidth and redundancy between all devices, allowing data traffic to be load shared across all paths of a mesh network. To enhance resiliency in the access layer SPB can also be integrated with link aggregation functions, such as standards-based 802.1AX and proprietary multi-chassis link aggregation (MC-LAG) implementations.

The technology provides logical Ethernet networks on native Ethernet infrastructures using a link state protocol (LSP) to advertise both topology and logical network membership. Packets are encapsulated at the edge either in MAC-in-MAC 802.1ah or tagged 802.1Q/802.1ad frames and transported only to other members of the logical network. Unicast, multicast, and broadcast are supported and all routing is on symmetric shortest paths. The control plane is based on the Intermediate System to Intermediate System (IS-IS), leveraging a small number of extensions defined in RFC 6329. For deployments within a Data Center, SPB overall provides good traffic management, when comparing to other technologies for controlling data traffic such as Ethernet virtual private network (VPN), which is well suited for interconnecting Data Centers.

SUMMARY

A method is implemented by a node for enabling shortest path bridging in a network that is scalable to support sixteen million virtual local area network (VLAN) identifiers using multiprotocol label switching (MPLS) encapsulation. The method comprises allocating a tunnel label using a distributed tunnel label allocation algorithm, allocating a source label using a distributed source label allocation algorithm, assigning a bridge instance a service label, and distributing the tunnel label, source label and service label to other nodes in the MPLS network.

In another embodiment, a network device functions as a node implementing a method for enabling shortest path bridging in a network that is scalable to support sixteen million virtual local area network (VLAN) identifiers using multiprotocol label swapping (MPLS) encapsulation. The network device includes a non-transitory computer-readable medium having stored therein a shortest path bridging label mode (SPBL) module, and a processor coupled to the non-transitory computer-readable medium, the processor configured to execute the SPBL module, the SPBL module configured to allocate a tunnel label using a distributed tunnel label allocation algorithm, to allocate a source label using a distributed source label allocation algorithm, to assign a bridge instance a service label, and to distribute the tunnel label, source label and service label to other nodes in the MPLS network.

In another embodiment, a computing device functions as a node of a network domain, the computing device to execute a plurality of virtual machines for implementing network function virtualization (NFV), wherein a virtual machine from the plurality of virtual machines is configured to implement a method for enabling shortest path bridging in a network that is scalable to support sixteen million virtual local area network (VLAN) identifiers using multiprotocol label swapping (MPLS) encapsulation. the computing device includes a non-transitory computer-readable medium having stored therein a shortest path bridging label mode (SPBL) module, and a processor coupled to the non-transitory computer-readable medium, the processor configured to execute the virtual machine, the virtual machine configured to execute the SPBL module, the SPBL module configured to allocate a tunnel label using a distributed tunnel label allocation algorithm, to allocate a source label using a distributed source label allocation algorithm, to assign a bridge instance a service label, and to distribute the tunnel label, source label and service label to other nodes in the MPLS network.

In a further embodiment, a control plane device is configured to implement a control plane of a software defined networking (SDN) network including a plurality of network devices implementing the method for enabling shortest path bridging in a network that is scalable to support sixteen million virtual local area network (VLAN) identifiers using multiprotocol label swapping (MPLS) encapsulation. The control plane device includes a non-transitory computer-readable medium having stored therein a shortest path bridging label mode (SPBL) module. The control plane device further includes a processor coupled to the non-transitory computer-readable medium. The processor is configured to execute the SPBL module. The SPBL module is configured to allocate a tunnel label using a distributed tunnel label allocation algorithm, to allocate a source label using a distributed source label allocation algorithm, to assign a bridge instance a service label, and to distribute the tunnel label, source label and service label to other nodes in the MPLS network.

BRIEF DESCRIPTION OF THE DRAWINGS

The invention may best be understood by referring to the following description and accompanying drawings that are used to illustrate embodiments of the invention. In the drawings:

FIG. 6C illustrates various exemplary ways in which virtual network elements (VNEs) may be coupled according to some embodiments of the invention.

FIG. 6D illustrates a network with a single network element (NE) on each of the NDs of FIG. 6A.

FIG. 6E illustrates an example where each of the NDs implements a single NE (see FIG. 6D), but the centralized control plane has abstracted multiple of the NEs in different NDs into a single NE in one of the virtual network(s) of FIG. 6D, according to some embodiments of the invention.

FIG. 6F illustrates a case where multiple VNEs are implemented on different NDs and are coupled to each other, and where the centralized control plane has abstracted these multiple VNEs such that they appear as a single VNE within one of the virtual networks of FIG. 6, according to some embodiments of the invention.

DETAILED DESCRIPTION

Figure 1:
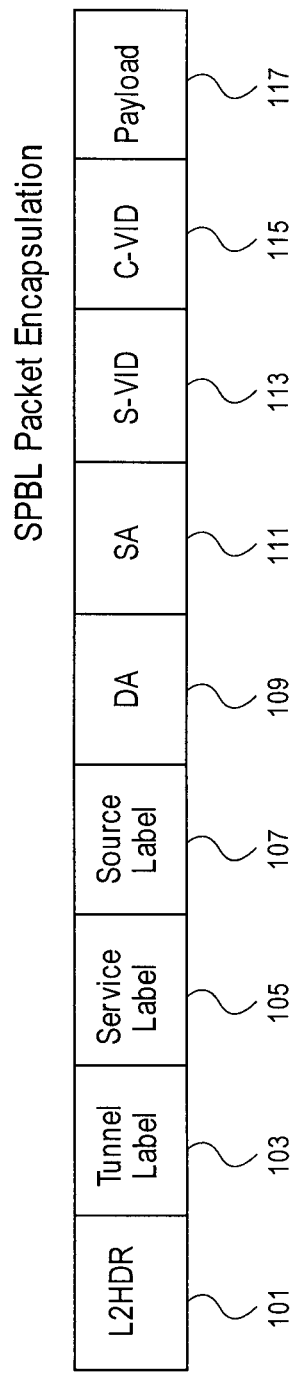
FIG. 1 is a diagram of an example packet and encapsulation for SPBL.

The following description describes methods and apparatus for implementing a system for establishing shortest path bridging in a network using multi-protocol label switching (MPLS) encapsulation as an alternative to media access control (MAC) in MAC encapsulation referred to as shortest path bridging MAC (SPBM) and to shortest path bridging virtual local area network (SPBV). The method and system is implemented at each network node that implements a bridge instance by configuring the network nodes to utilize a set of tunnel labels, service labels and source labels to forward data traffic across a network. The shortest path bridging is thus a MAC in MPLS encapsulation that provides the benefit of supporting a higher level of scalability by supporting a large number of paths without requiring hardware modifications. This process is referred to as shortest path bridging label mode (SPBL).

References in the specification to "one embodiment," "an embodiment," "an example embodiment," etc., indicate that the embodiment described may include a particular feature, structure, or characteristic, but not every embodiment may necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Overview

Shortest path bridging (SPB) is widely utilized to manage data traffic over layer 2 networks. SPB has two variations, first a virtual local area network (VLAN) based SPB referred to as SPBV, and second a media access control (MAC)-in-MAC based SPB referred to as SPBM. The two variations each have their own drawbacks. SPBV can only scale to support up to 4096 VLANs, which are utilized for forwarding data traffic between bridges in the network. A common usage for SPB is in networks of data centers. A typical data center needs far more than that number of VLANs to properly manage data traffic between the servers of the data center. In contrast, SPBM supports a VLAN space of over 16 million, however SPBM requires significant hardware changes to enable MAC-in-MAC forwarding. All of the network nodes must be able to support the MAC-in-MAC encapsulation at the hardware level for efficient data traffic forwarding in a given network. This entails a significant network investment to upgrade or replace all of the non-supporting network nodes.

The embodiments provide an alternate system and process for performing SPB in a network that provides scalability without hardware costs. The embodiments use MAC in MPLS encapsulation instead of VLAN or MAC-in MAC, while preserving most of Ethernet services supported by SPB. The process of the embodiments is referred to as shortest path bridging label mode (SPBL).

Using SPBL the backbone switches/routers will encapsulate customer side Ethernet frames in a multi-protocol label stack (MPLS) label stack for transport across the provider backbone network which is an internet protocol/MPLS network. This isolation follows the SPBM system and allows greater scalability. Essentially, the embodiments use the MPLS label stack to replace 802.1ah Mac-in-Mac encapsulation. A stack of three MPLS labels are used in the encapsulation, as described in FIG. 1.

FIG. 1 is a diagram of one embodiment of a data packet encapsulated with MPLS for SPBL. The outermost header information 101 is the level 2 network header that is utilized to forward the data packet at the level 2 layer. The outer label 103 is a tunnel label or transport label, used to deliver packets from the ingress switch of the network to the egress switch(es) of the network. It provides the equivalent function of the backbone destination address (B-DA) in SPBM. This label can have either unicast or multicast forwarding actions associated with it. The second label 105 is a service identification label or service label, used to identify which service instance/virtual private network (VPN) that the data traffic belongs to. It provides the equivalent function of the service identifier (I-SID) in SPBM. The third label 107 is a source identification label or source label, used to identify the source switch to enable forwarding plane learning. It provides the equivalent function of the backbone source address (B-SA) in SPBM. Using separate service label and source label can help improve the overall scalability, allowing much larger label space to identify service instances.

The remainder of the illustrated structure includes the underlying data structure. The encapsulated data structure includes a destination address (DA) 109, source address (SA) 111, service identifier (S-VID) 113, the customer identifier (C-VID) as well as the payload 117. The MPLS labels encapsulate the data packet to traverse the MPLS/IP network. The use of the separate service label and source label help improve the overall scalability, allowing a much larger label space to identify service instances.

Figure 2:
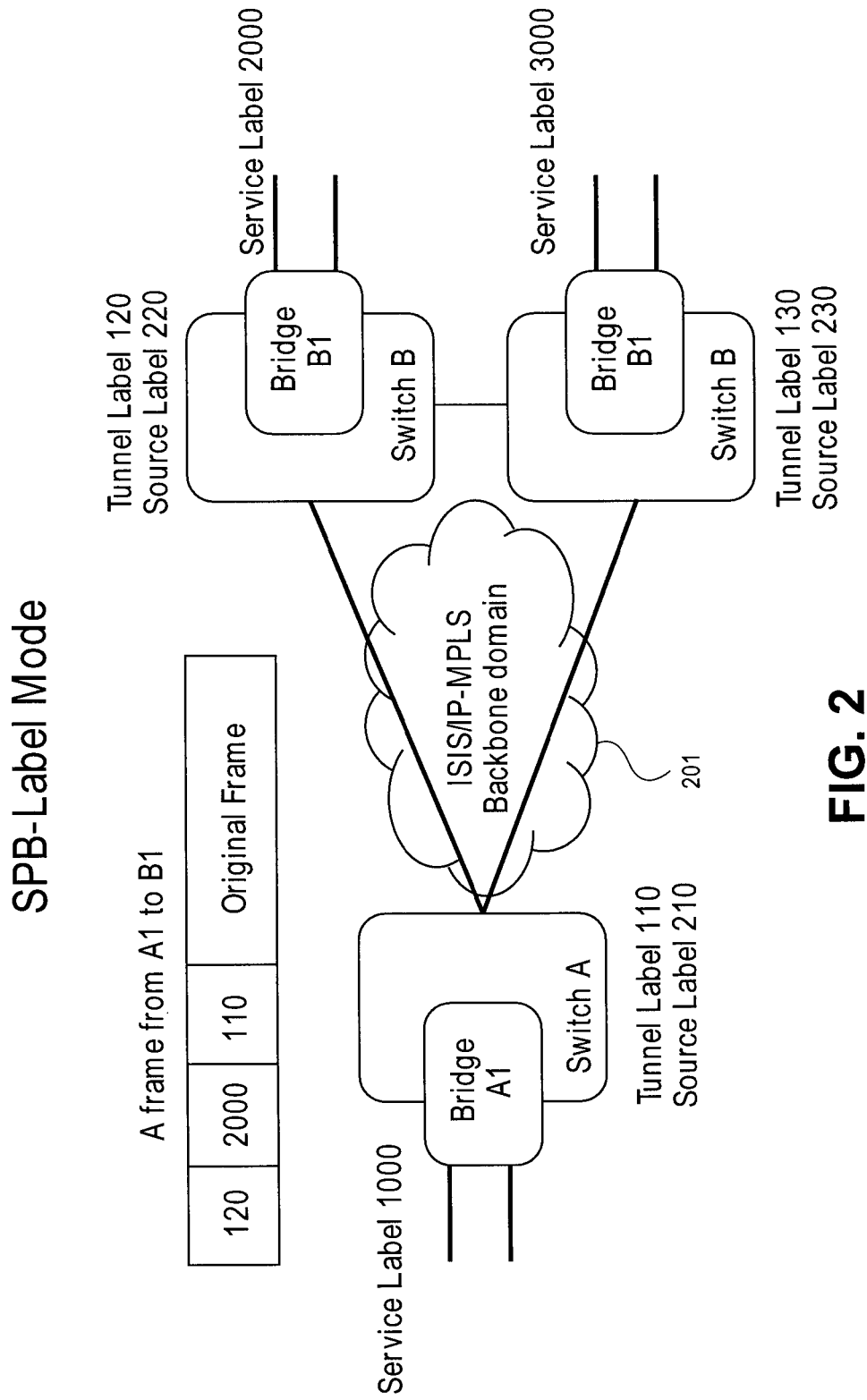
FIG. 2 is a diagram of one embodiment of an example network implementing shortest spanning bridge label mode (SPBL).

The architecture that supports and implements the SPBL is described if relation to FIG. 2. In one embodiment, intermediate system to intermediate system (ISIS) is utilized as the control plane protocol running in the provider IP/MPLS network 201. Each node in the network (e.g., each switch) will allocate and distribute a tunnel label and a source label, for the loopback interface address of the node. An example set of label allocations for the example network is illustrated in FIG. 1. These labels are distributed to other nodes in the network via ISIS-Segment routing. One or more bridges instances can be running on each node. Each bridge instance will be assigned a service label, which is locally unique on the node.

The figure illustrates a use case where a bridge instance A1 wants to send unicast frames to bridge instance B1, the frame will be encapsulated in a stack of three labels from an outer label to an inner label. The outer label is the tunnel label 120 for switch B, the service label is 2000 for bridge instance B1, and the source label is for switch A. When switch B receives the frame the tunnel label 120 will be popped, then the service label will instruct switch B to deliver the frame to bridge instance B1. Finally, source label 110 will help the learning process on bridge instance B1 to identify the source of the frame to be switch A.

In this example embodiment, ISIS can be used as a control plane protocol. In this embodiment, an IP/MPLS network will run ISIS as the control protocol, which allocates and distributes all three labels for the SPBL solution, in conjunction with new multicast technology such as bit indexed explicit replication (BIER).

Thus, it can be seen from the example network topology that using ISIS or a similar control protocol, that SPBL can be implemented across the IP/MPLS network. The example network demonstrates that each node (i.e. each switch) can generate and exchange the tunnel labels, source labels and service labels necessary for the proper forwarding of the data traffic across the IP/MPLS network to the node implementing the bridge instance that is associated with a service label and that can forward the data traffic to the next hop outside the network.

Tunnel Labels

Tunnel labels are utilized to identify a path across the IP/MPLS network between two nodes hosting bridge instances that are a part of the SPBL topology. The tunnel labels can have any format and can vary depending on whether they are associated with unicast data traffic or multi-cast data traffic.

For unicast data traffic, the tunnel labels can be allocated and advertised by ISIS traffic, in one embodiment by following the internet engineering task force (IETF) standard for segment routing, as described in https://tools.ietforg/html/draft-ietf-isis-segment-routing-extensions-03. ISIS can calculate the shortest path between any ingress and egress pair. For unicast traffic, the tunnel label can be either global within the provider domain (derived from SID and label block base), or can be locally significant for each node (i.e. each switch).

For multicast traffic, a BIER based solution can be used to encode the multicast membership of a service instance/VPN in the packet header. BIER with MPLS encapsulation can be utilized in some embodiments and BIER with ISIS as control protocol can also be utilized. Alternatively, it is possible to augment ISIS to let ISIS manage multicast group membership in the domain and allocated point to multipoint (p2mp) MPLS tunnel labels for these underlying multicast groups.

Service Labels

Service labels are utilized to identify specific external services or service providers reachable through a given bridge instance. The service labels can also be allocated and advertised in ISIS. Each switch when advertising its VLAN membership can also advertise a service label for data traffic sent onto this VLAN. If data traffic is unicast, the service label will be downstream allocated. If traffic is multicast, the service label will be upstream allocated. The underlying MPLS layer must support context label space and upstream allocated labels.

Source Labels

The source labels are used to uniquely identify the source node for purposes of learning and preventing loop backs. A new block of global labels can be allocated as source labels in a similar fashion as the tunnel labels; however, here the source labels are mainly used for source identification purposes and for the MAC learning process.

Mixed Control Plane Protocols

In further embodiments it is possible to use a mixture of protocols in the control plane, including any number or assortment of protocols to distribute or advertise the tunnel, source and/or service labels. In a few example embodiments, the following mixture of command protocols can be utilized: ISIS/Open Shortest Path First (OSPF) to compute the routes to reach each of the routers in the backbone network; label distribution protocol (LDP) to distribute the tunnel labels for unicast traffic, and use multicast LDP to distribute tunnel labels for multicast traffic; ISIS/OSPF to distribute service labels, in this case service labels are of local significance.

As discussed above, the embodiments can address the shortcomings of both SPBV and SPBM. With Label based backbone switching, the total VLAN numbers this method can support goes up to 16 million from 4,000 to which SPBV is confined. On core and edge routers, this process is particularly advantageous over the SPBM as one can leverage the standard/existing MPLS label forwarding, as opposed to a required hardware update to accommodate SPBM's MAC-in-MAC encapsulation.

Figure 3:
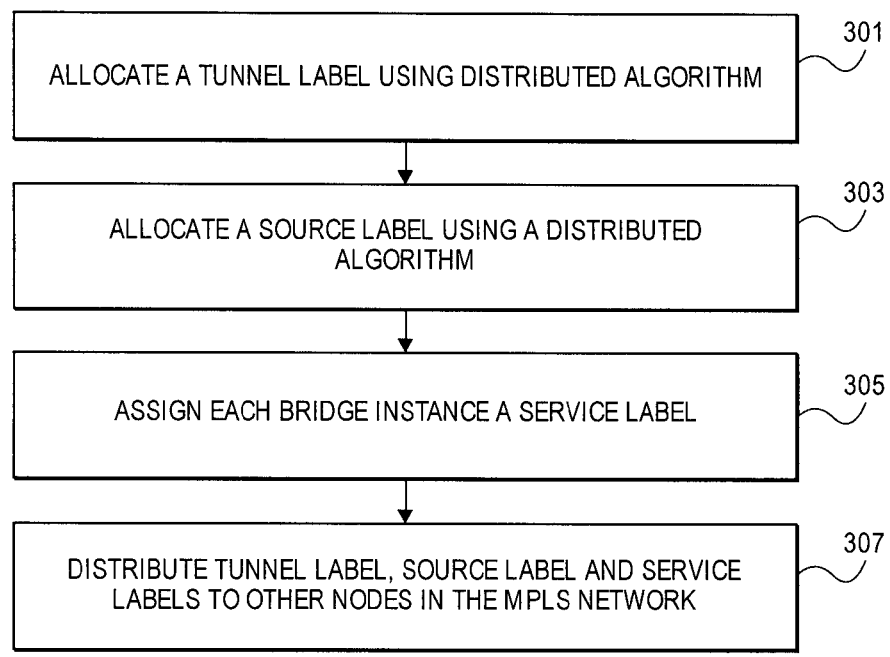
FIG. 3 is a diagram of one embodiment of a process for configuring the network to assign a service label and distribute bridge identifier and label switched path information to each bridge instance.

FIG. 3 is a diagram of one embodiment of a process for configuring nodes for SPBL. The process begins with the node allocating a tunnel label using a distributed algorithm (Block 301). The determination and allocation of tunnel labels can utilize any system or algorithm that uniquely identifies the tunnels that have been generated to support SPB across an IP/MPLS network. In other embodiments the tunnel labels may be allocated and provided by a centralized controller using software defined networking or a similar protocol. The process can then continue by allocating a source label using a distributed algorithm (Block 303). The determination and allocation of source labels can utilize any system or algorithm that uniquely identifies the node within the network. In other embodiments the source labels may be allocated and provided by a centralized controller using OpenFlow or a similar protocol.

Each bridge instance hosted by a node can then be assigned a service label (Block 305). The determination and assignment of service labels can utilize any system or algorithm that uniquely identifies the bridge instances uniquely to the node or the network. In other embodiments, the service labels are determined and provided by a centralized controller using OpenFlow or a similar protocol. Control plane protocols such as ISIS, LDP or similar control plane protocols can then be utilized to distribute the determined or assigned tunnel, source and/or service labels with other nodes in the MPLS network (Block 307).

Figure 4:
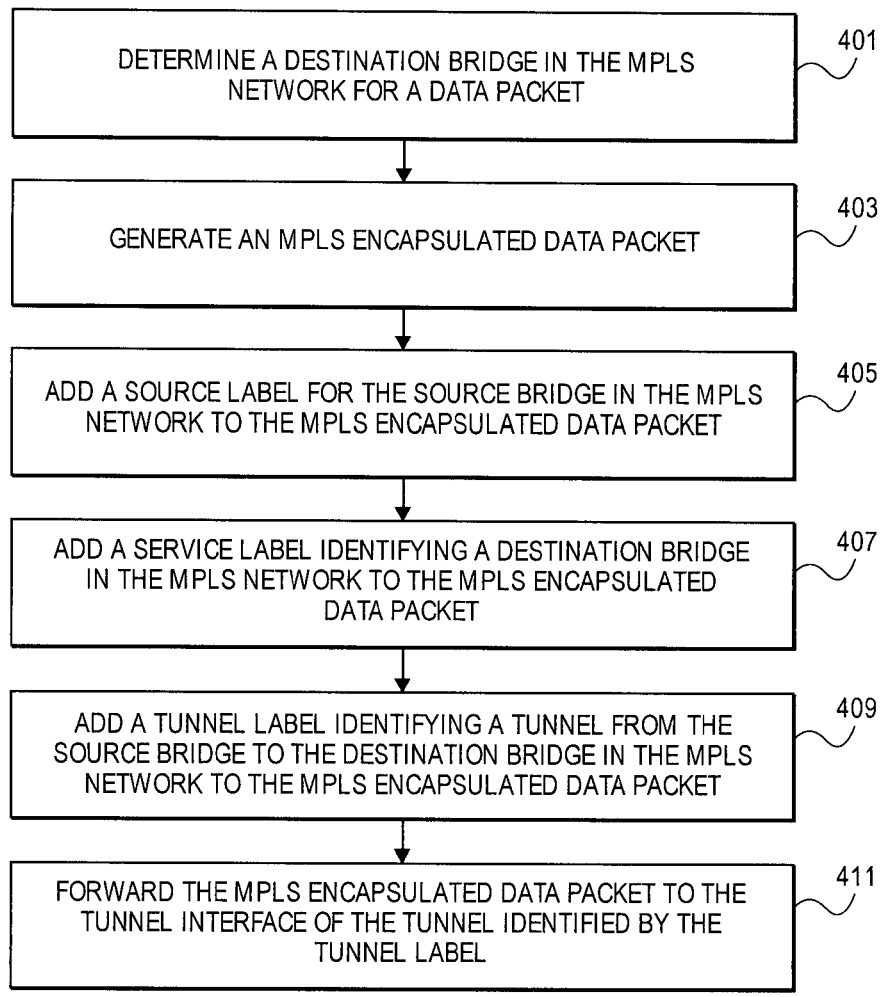
FIG. 4 is a diagram of one embodiment of a process for forwarding data packets across the network using SPBL.

FIG. 4 is a diagram of one embodiment of a process for forwarding data traffic at a network node configured for SPBL. In one embodiment, the process can be initiated in response to the receipt or generation of a data packet to be forwarded by a node in the network. The node determines a destination bridge in the MPLS network for the data packet (Block 401). This may include determining a bridge instance of the node that will forward the data packet toward the destination bridge. The MPLS encapsulation is then generated for the data packet (Block 403) using the encapsulation scheme described herein above in regard to FIG. 1. The encapsulation is completed by adding a source label for the sending source bridge instance in the MPLS encapsulation of the data packet (Block 405).

A service label identifying the service node can then be added to the MPLS encapsulation (Block 407). Further a tunnel label identifying the tunnel from the source bridge to the destination bridge in the MPLS network is added to the MPLS encapsulated data packet (Block 409). The order of adding the source, service and tunnel labels can be varied such that any of the labels are added in any order or in parallel. Once all of the labels have been added to complete the MPLS encapsulation, then the data packet can be forwarded to the tunnel interface of the tunnel identified by the tunnel label on the source bridge to be transmitted to the next hop on the path toward the destination bridge (Block 411).

Architecture

Figure 5:
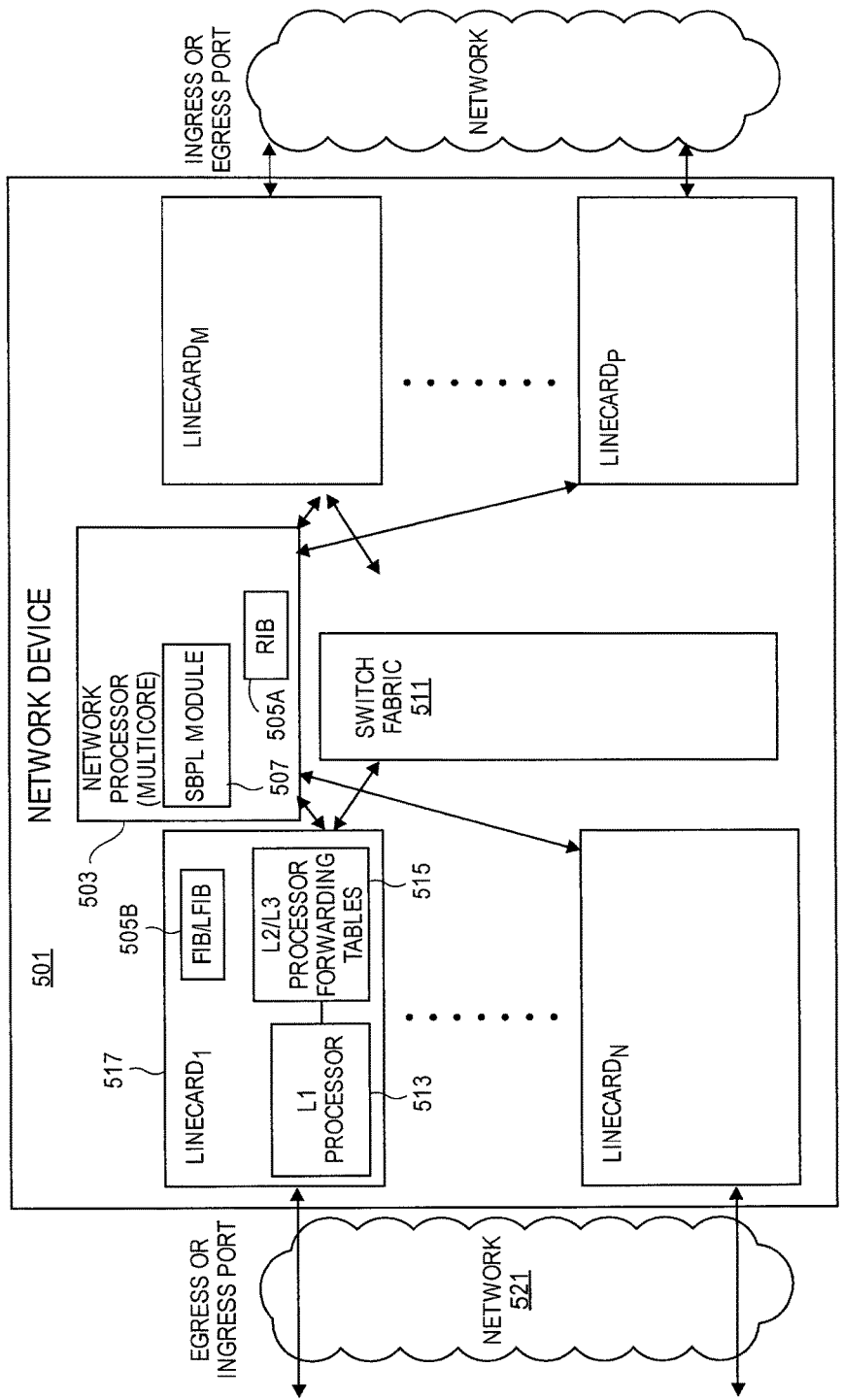
FIG. 5 is a diagram of one embodiment of a network device (ND) implementing a process for SPBL configuration and data packet forwarding.

FIG. 5 is a diagram of one embodiment of a network device implementing the SPBL process and system. A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

In one embodiment, the configuration of SPBL and forwarding of data packets using SPBL is implemented by a network device 501 or similar computing device. The network device 501 can have any structure that enables it to receive data traffic and forward it toward its destination. The network device 501 can include a network processor 503 or set of network processors that execute the functions of the network device 501. A 'set,' as used herein, is any positive whole number of items including one item. The network device 501 can execute an a SPBL module 507 to implement the functions of configuring the node for proper forwarding of data packets across an IP/MPLS networks where the network device 501 functions as node in this network as described herein above via a network processor 503.

The network device 501 connects with separately administered networks that have user equipment and/or content servers. The network processor 503 can implement the SPBL module 507 as a discrete hardware, software module or any combination thereof. The network processor 503 can also service the routing information base 505A and similar functions related to data traffic forwarding and network topology maintenance. The routing information base 505A can be implemented as match action tables that are utilized for forwarding protocol data units PDUs (i.e. packets). The functions of the SPBL module 507 can be implemented as modules in any combination of software, including firmware, and hardware within the network device. The functions of the SPBL module 507 that are executed and implemented by the network device 501 include those described further herein above.

In one embodiment, the network device 501 can include a set of line cards 517 that process and forward the incoming data traffic toward the respective destination nodes by identifying the destination and forwarding the data traffic to the appropriate line card 517 having an egress port that leads to or toward the destination via a next hop. These line cards 517 can also implement the forwarding information base and/label forwarding base 505B, or a relevant subset thereof. The line cards 517 can also implement or facilitate the SPBL module 507 functions described herein above. The line cards 517 are in communication with one another via a switch fabric 511 and communicate with other nodes over attached networks 521 using Ethernet, fiber optic or similar communication links and media.

The operations of the flow diagrams have been described with reference to the exemplary embodiment of the block diagrams. However, it should be understood that the operations of the flowcharts could be performed by embodiments of the invention other than those discussed, and the embodiments discussed with reference to block diagrams can perform operations different from those discussed with reference to the flowcharts. While the flowcharts show a particular order of operations performed by certain embodiments, it should be understood that such order is exemplary (e.g., alternative embodiments may perform the operations in a different order, combine certain operations, overlap certain operations, etc.).

As described herein, operations performed by the network device 501 may refer to specific configurations of hardware such as application specific integrated circuits (ASICs) configured to perform certain operations or having a predetermined functionality, or software instructions stored in memory embodied in a non-transitory computer readable storage medium. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. One or more parts of an embodiment of the invention may be implemented using different combinations of software, firmware, and/or hardware.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set of one or more physical network interface(s) to establish network connections (to transmit and/or receive code and/or data using propagating signals) with other electronic devices. One or more parts of an embodiment of the invention may be implemented using different combinations of software, firmware, and/or hardware.

Figures 6A, 6B:
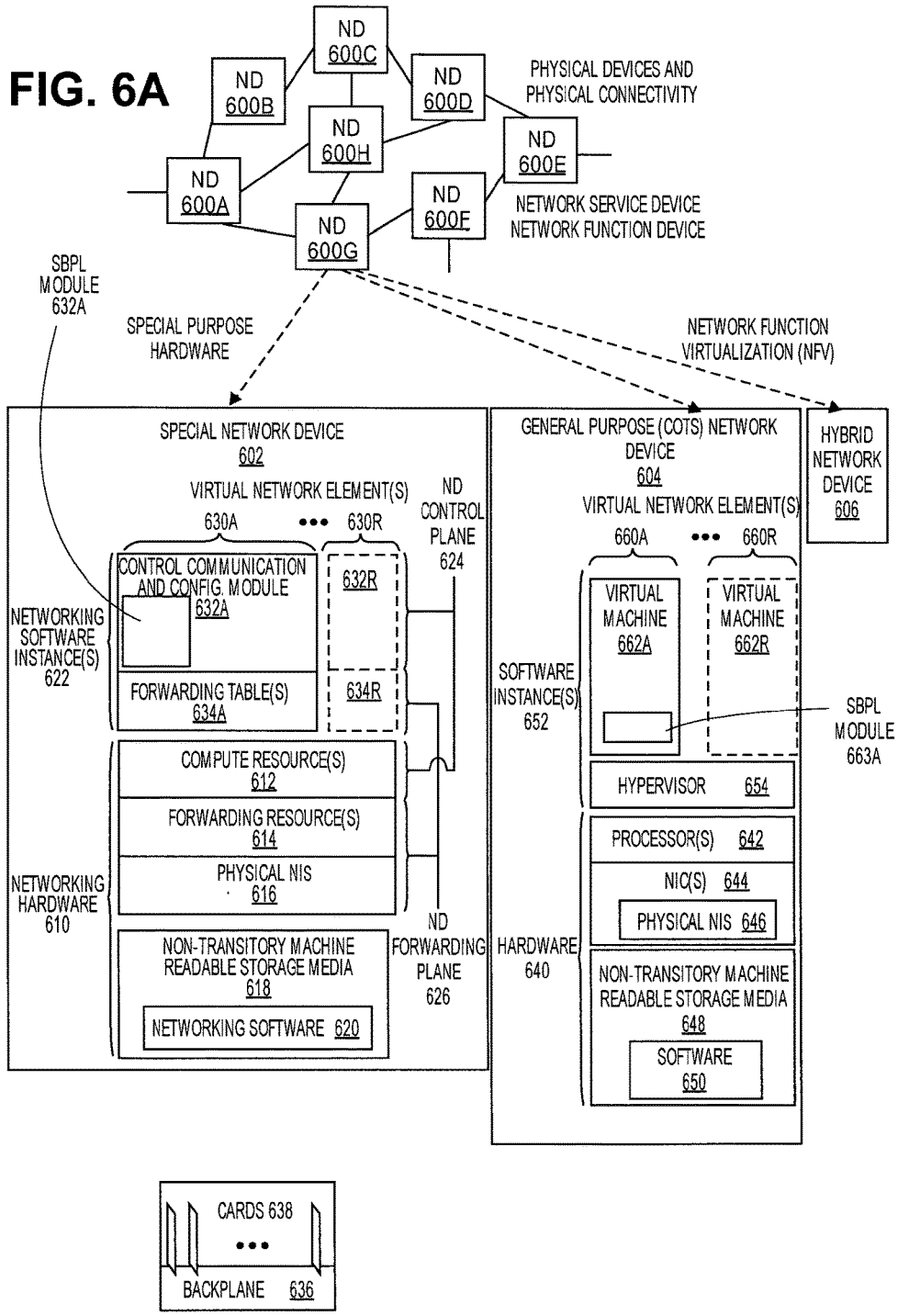
FIG. 6A illustrates connectivity between network devices (NDs) within an exemplary network, as well as three exemplary implementations of the NDs, according to some embodiments of the invention.
FIG. 6B illustrates an exemplary way to implement the special-purpose network device according to some embodiments of the invention.

FIG. 6A illustrates connectivity between network devices (NDs) within an exemplary network, as well as three exemplary implementations of the NDs, according to some embodiments of the invention. FIG. 6A shows NDs 600A-H and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 600A, E, and F illustrates that these NDs act as ingress and egress points for the network (and thus, these NDs are sometimes referred to as edge NDs; while the other NDs may be called core NDs).

Two of the exemplary ND implementations in FIG. 6A are: 1) a special-purpose network device 602 that uses custom application-specific integrated circuits (ASICs) and a proprietary operating system (OS); and 2) a general-purpose network device 604 that uses common off-the-shelf (COTS) processors and a standard OS.

The special-purpose network device 602 includes networking hardware 610 comprising compute resource(s) 612 (which typically include a set of one or more processors), forwarding resource(s) 614 (which typically include one or more ASICs and/or network processors), and physical network interfaces (NIs) 616 (sometimes called physical ports), as well as non-transitory machine readable storage media 618 having stored therein networking software 620. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 600A-H. During operation, the networking software 620 may be executed by the networking hardware 610 to instantiate a set of one or more networking software instance(s) 622. Each of the networking software instance(s) 622, and that part of the networking hardware 610 that executes that network software instance (be it hardware dedicated to that networking software instance and/or time slices of hardware temporally shared by that networking software instance with others of the networking software instance(s) 622), form a separate virtual network element 630A-R. Each of the virtual network element(s) (VNEs) 630A-R includes a control communication and configuration module 632A-R (sometimes referred to as a local control module or control communication module) and forwarding table(s) 634A-R such that a given virtual network element (e.g., 630A) includes the control communication and configuration module (e.g., 632A), a set of one or more forwarding table(s) (e.g., 634A), and that portion of the networking hardware 610 that executes the virtual network element (e.g., 630A). In some embodiments, the control communication and configuration module 632A encompasses the SPBL module 633A as described herein above.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

The special-purpose network device 602 is often physically and/or logically considered to include: 1) a ND control plane 624 (sometimes referred to as a control plane) comprising the compute resource(s) 612 that execute the control communication and configuration module(s) 632A-R; and 2) a ND forwarding plane 626 (sometimes referred to as a forwarding plane, a data plane, or a media plane) comprising the forwarding resource(s) 614 that utilize the forwarding table(s) (i.e. implemented as match action tables) 634A-R and the physical NIs 616. By way of example, where the ND is a router (or is implementing routing functionality), the ND control plane 624 (the compute resource(s) 612 executing the control communication and configuration module(s) 632A-R) is typically responsible for participating in controlling how data (e.g., packets) are to be routed (e.g., the next hop for the data and the outgoing physical NI for that data) and storing that routing information in the forwarding table(s) 634A-R, and the ND forwarding plane 626 is responsible for receiving that data on the physical NIs 616 and forwarding that data out the appropriate ones of the physical NIs 816 based on the forwarding table(s) 634A-R.

FIG. 6B illustrates an exemplary way to implement the special-purpose network device 602 according to some embodiments of the invention. FIG. 6B shows a special-purpose network device including cards 838 (typically hot pluggable). While in some embodiments the cards 638 are of two types (one or more that operate as the ND forwarding plane 626 (sometimes called line cards), and one or more that operate to implement the ND control plane 624 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec) (RFC 4301 and 4309), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 636 (e.g., a first full mesh coupling the line cards and a second full mesh coupling all of the cards).

Returning to FIG. 6A, the general purpose network device 604 includes hardware 640 comprising a set of one or more processor(s) 642 (which are often COTS processors) and network interface controller(s) 644 (NICs; also known as network interface cards) (which include physical NIs 646), as well as non-transitory machine readable storage media 648 having stored therein software 650. During operation, the processor(s) 642 execute the software 650 to instantiate a hypervisor 654 (sometimes referred to as a virtual machine monitor (VMM)) and one or more virtual machines 662A-R that are run by the hypervisor 654, which are collectively referred to as software instance(s) 652. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes. Each of the virtual machines 662A-R, and that part of the hardware 640 that executes that virtual machine (be it hardware dedicated to that virtual machine and/or time slices of hardware temporally shared by that virtual machine with others of the virtual machine(s) 662A-R), forms a separate virtual network element(s) 660A-R. In some embodiments, the virtual machine module 662A encompasses SPBL module 664A.

The virtual network element(s) 660A-R perform similar functionality to the virtual network element(s) 630A-R. For instance, the hypervisor 654 may present a virtual operating platform that appears like networking hardware 610 to virtual machine 662A, and the virtual machine 662A may be used to implement functionality similar to the control communication and configuration module(s) 632A and forwarding table(s) 634A (this virtualization of the hardware 640 is sometimes referred to as network function virtualization (NFV)). Thus, NFV may be used to consolidate many network equipment types onto industry standard high volume server hardware, physical switches, and physical storage, which could be located in Data centers, NDs, and customer premises equipment (CPE). However, different embodiments of the invention may implement one or more of the virtual machine(s) 662A-R differently. For example, while embodiments of the invention are illustrated with each virtual machine 662A-R corresponding to one VNE 660A-R, alternative embodiments may implement this correspondence at a finer level of granularity (e.g., line card virtual machines virtualize line cards, control card virtual machine virtualize control cards, etc.); it should be understood that the techniques described herein with reference to a correspondence of virtual machines to VNEs also apply to embodiments where such a finer level of granularity is used.

In certain embodiments, the hypervisor 654 includes a virtual switch that provides similar forwarding services as a physical Ethernet switch. Specifically, this virtual switch forwards traffic between virtual machines and the NIC(s) 644, as well as optionally between the virtual machines 662A-R; in addition, this virtual switch may enforce network isolation between the VNEs 660A-R that by policy are not permitted to communicate with each other (e.g., by honoring virtual local area networks (VLANs)).

The third exemplary ND implementation in FIG. 6A is a hybrid network device 606, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 602) could provide for para-virtualization to the networking hardware present in the hybrid network device 606.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 630A-R, VNEs 660A-R, and those in the hybrid network device 606) receives data on the physical NIs (e.g., 616, 646) and forwards that data out the appropriate ones of the physical NIs (e.g., 616, 646). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317).

FIG. 6C illustrates various exemplary ways in which VNEs may be coupled according to some embodiments of the invention. FIG. 6C shows VNEs 670A.1-670A.P (and optionally VNEs 670A.Q-670A.R) implemented in ND 600A and VNE 670H.1 in ND 600H. In FIG. 6C, VNEs 670A.1-P are separate from each other in the sense that they can receive packets from outside ND 600A and forward packets outside of ND 600A; VNE 670A.1 is coupled with VNE 670H.1, and thus they communicate packets between their respective NDs; VNE 670A.2-670A.3 may optionally forward packets between themselves without forwarding them outside of the ND 600A; and VNE 670A.P may optionally be the first in a chain of VNEs that includes VNE 670A.Q followed by VNE 670A.R (this is sometimes referred to as dynamic service chaining, where each of the VNEs in the series of VNEs provides a different service—e.g., one or more layer 4-7 network services). While FIG. 6C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 6A, for example, may form part of the Internet or a private network; and other electronic devices (not shown; such as end user devices including workstations, laptops, netbooks, tablets, palm tops, mobile phones, smartphones, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content server or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 6A may also host one or more such servers (e.g., in the case of the general purpose network device 604, one or more of the virtual machines 662A-R may operate as servers; the same would be true for the hybrid network device 606; in the case of the special-purpose network device 602, one or more such servers could also be run on a hypervisor executed by the compute resource(s) 612); in which case the servers are said to be co-located with the VNEs of that ND.

A virtual network is a logical abstraction of a physical network (such as that in FIG. 6A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN RFC 4364) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

FIG. 6D illustrates a network with a single network element on each of the NDs of FIG. 6A, and within this straight forward approach contrasts a traditional distributed approach (commonly used by traditional routers) with a centralized approach for maintaining reachability and forwarding information (also called network control), according to some embodiments of the invention. Specifically, FIG. 6D illustrates network elements (NEs) 670A-H with the same connectivity as the NDs 600A-H of FIG. 6A.

FIG. 6D illustrates that the distributed approach 672 distributes responsibility for generating the reachability and forwarding information across the NEs 670A-H; in other words, the process of neighbor discovery and topology discovery is distributed.

For example, where the special-purpose network device 602 is used, the control communication and configuration module(s) 632A-R of the ND control plane 624 typically include a reachability and forwarding information module to implement one or more routing protocols (e.g., an exterior gateway protocol such as Border Gateway Protocol (BGP) (RFC 4271), Interior Gateway Protocol(s) (IGP) (e.g., Open Shortest Path First (OSPF) (RFC 2328 and 5340), Intermediate System to Intermediate System (IS-IS) (RFC 1142), Routing Information Protocol (RIP) (version 1 RFC 1058, version 2 RFC 2453, and next generation RFC 2080)), Label Distribution Protocol (LDP) (RFC 5036), Resource Reservation Protocol (RSVP) (RFC 2205, 2210, 2211, 2212, as well as RSVP-Traffic Engineering (TE): Extensions to RSVP for LSP Tunnels RFC 3209, Generalized Multi-Protocol Label Switching (GMPLS) Signaling RSVP-TE RFC 3473, RFC 3936, 4495, and 4558)) that communicate with other NEs to exchange routes, and then selects those routes based on one or more routing metrics. Thus, the NEs 670A-H (e.g., the compute resource(s) 612 executing the control communication and configuration module(s) 632A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 624. The ND control plane 624 programs the ND forwarding plane 626 with information (e.g., adjacency and route information) based on the routing structure(s). For example, the ND control plane 624 programs the adjacency and route information into one or more forwarding table(s) 634A-R that are implementations of match action tables (e.g., Forwarding Information Base (FIB), Label Forwarding Information Base (LFIB), and one or more adjacency structures) on the ND forwarding plane 626. For layer 2 forwarding, the ND can store one or more bridging tables that are used to forward data based on the layer 2 information in that data. While the above example uses the special-purpose network device 602, the same distributed approach 672 can be implemented on the general purpose network device 604 and the hybrid network device 606.

FIG. 6D illustrates that a centralized approach 674 (also known as software defined networking (SDN)) that decouples the system that makes decisions about where traffic is sent from the underlying systems that forwards traffic to the selected destination. The illustrated centralized approach 674 has the responsibility for the generation of reachability and forwarding information in a centralized control plane 676 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 676 has a south bound interface 682 with a data plane 680 (sometime referred to the infrastructure layer, network forwarding plane, or forwarding plane (which should not be confused with a ND forwarding plane)) that includes the NEs 670A-H (sometimes referred to as switches, forwarding elements, data plane elements, or nodes). The centralized control plane 676 includes a network controller 678, which includes a centralized reachability and forwarding information module 679 that determines the reachability within the network and distributes the forwarding information to the NEs 670A-H of the data plane 680 over the south bound interface 682 (which may use the OpenFlow protocol). Thus, the network intelligence is centralized in the centralized control plane 676 executing on electronic devices that are typically separate from the NDs.

For example, where the special-purpose network device 602 is used in the data plane 680, each of the control communication and configuration module(s) 632A-R of the ND control plane 624 typically include a control agent that provides the VNE side of the south bound interface 682. In this case, the ND control plane 624 (the compute resource(s) 612 executing the control communication and configuration module(s) 632A-R) performs its responsibility for participating in controlling how data (e.g., packets) is to be routed (e.g., the next hop for the data and the outgoing physical NI for that data) through the control agent communicating with the centralized control plane 676 to receive the forwarding information (and in some cases, the reachability information) from the centralized reachability and forwarding information module 679 (it should be understood that in some embodiments of the invention, the control communication and configuration module(s) 632A-R, in addition to communicating with the centralized control plane 676, may also play some role in determining reachability and/or calculating forwarding information—albeit less so than in the case of a distributed approach; such embodiments are generally considered to fall under the centralized approach 674, but may also be considered a hybrid approach). In some embodiments, the centralized reachability and forwarding module 679 encompasses SPBL functions in SPBL module 681 as described herein above.

While the above example uses the special-purpose network device 602, the same centralized approach 674 can be implemented with the general purpose network device 604 (e.g., each of the VNE 660A-R performs its responsibility for controlling how data (e.g., packets) is to be routed (e.g., the next hop for the data and the outgoing physical NI for that data) by communicating with the centralized control plane 676 to receive the forwarding information (and in some cases, the reachability information) from the centralized reachability and forwarding information module 679; it should be understood that in some embodiments of the invention, the VNEs 660A-R, in addition to communicating with the centralized control plane 676, may also play some role in determining reachability and/or calculating forwarding information—albeit less so than in the case of a distributed approach) and the hybrid network device 606. In fact, the use of SDN techniques can enhance the NFV techniques typically used in the general purpose network device 604 or hybrid network device 606 implementations as NFV is able to support SDN by providing an infrastructure upon which the SDN software can be run, and NFV and SDN both aim to make use of commodity server hardware and physical switches.

FIG. 6D also shows that the centralized control plane 676 has a north bound interface 684 to an application layer 686, in which resides application(s) 688. The centralized control plane 676 has the ability to form virtual networks 692 (sometimes referred to as a logical forwarding plane, network services, or overlay networks (with the NEs 670A-H of the data plane 680 being the underlay network)) for the application(s) 688. Thus, the centralized control plane 676 maintains a global view of all NDs and configured NEs/VNEs, and it maps the virtual networks to the underlying NDs efficiently (including maintaining these mappings as the physical network changes either through hardware (ND, link, or ND component) failure, addition, or removal). The application layer 686 thus enables the execution of applications that manage or interact with the functions associated with the network elements.

While FIG. 6D shows the distributed approach 672 separate from the centralized approach 674, the effort of network control may be distributed differently or the two combined in certain embodiments of the invention. For example: 1)

embodiments may generally use the centralized approach (SDN) 674, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 674, but may also be considered a hybrid approach.

While FIG. 6D illustrates the simple case where each of the NDs 600A-H implements a single NE 670A-H, it should be understood that the network control approaches described with reference to FIG. 6D also work for networks where one or more of the NDs 600A-H implement multiple VNEs (e.g., VNEs 630A-R, VNEs 660A-R, those in the hybrid network device 606). Alternatively or in addition, the network controller 678 may also emulate the implementation of multiple VNEs in a single ND. Specifically, instead of (or in addition to) implementing multiple VNEs in a single ND, the network controller 678 may present the implementation of a VNE/NE in a single ND as multiple VNEs in the virtual networks 692 (all in the same one of the virtual network(s) 692, each in different ones of the virtual network(s) 692, or some combination). For example, the network controller 678 may cause an ND to implement a single VNE (a NE) in the underlay network, and then logically divide up the resources of that NE within the centralized control plane 676 to present different VNEs in the virtual network(s) 692 (where these different VNEs in the overlay networks are sharing the resources of the single VNE/NE implementation on the ND in the underlay network).

On the other hand, FIGS. 6E and 6F respectively illustrate exemplary abstractions of NEs and VNEs that the network controller 678 may present as part of different ones of the virtual networks 692. FIG. 6E illustrates the simple case of where each of the NDs 600A-H implements a single NE 670A-H (see FIG. 6D), but the centralized control plane 676 has abstracted multiple of the NEs in different NDs (the NEs 670A-C and G-H) into (to represent) a single NE 6701 in one of the virtual network(s) 692 of FIG. 6D, according to some embodiments of the invention. FIG. 6E shows that in this virtual network, the NE 6701 is coupled to NE 670D and 670F, which are both still coupled to NE 670E.

FIG. 6F illustrates a case where multiple VNEs (VNE 670A.1 and VNE 670H.1) are implemented on different NDs (ND 600A and ND 600H) and are coupled to each other, and where the centralized control plane 676 has abstracted these multiple VNEs such that they appear as a single VNE 670T within one of the virtual networks 692 of FIG. 6D, according to some embodiments of the invention. Thus, the abstraction of a NE or VNE can span multiple NDs.

While some embodiments of the invention implement the centralized control plane 676 as a single entity (e.g., a single instance of software running on a single electronic device), alternative embodiments may spread the functionality across multiple entities for redundancy and/or scalability purposes (e.g., multiple instances of software running on different electronic devices).

Figure 7:
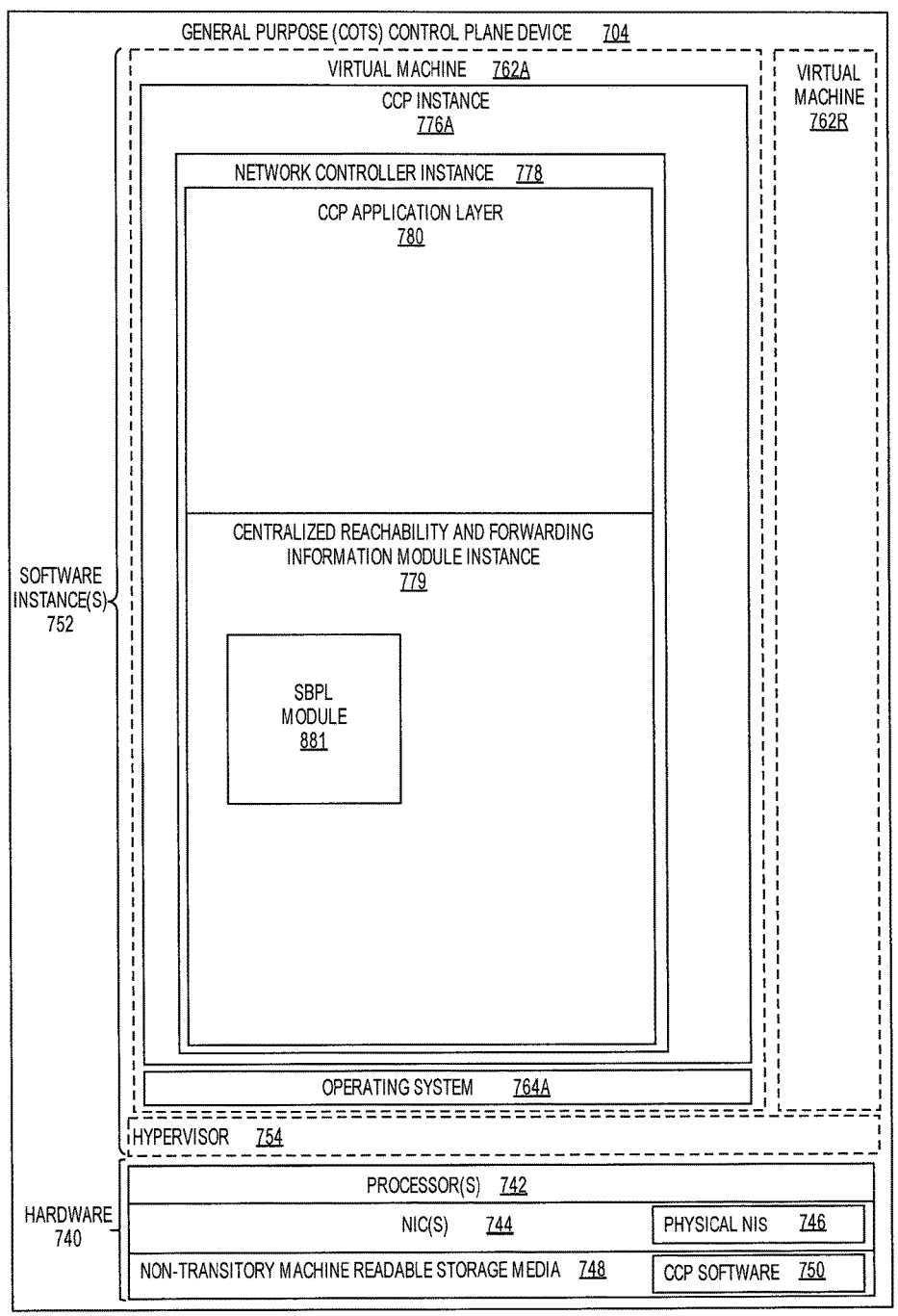
FIG. 7 illustrates a general purpose control plane device including hardware comprising a set of one or more processor(s) (which are often Commercial off-the-shelf (COTS) processors) and network interface controller(s) (NICs; also known as network interface cards) (which include physical NIs), as well as non-transitory machine readable storage media having stored therein centralized control plane (CCP) software), according to some embodiments of the invention.

Similar to the network device implementations, the electronic device(s) running the centralized control plane 676, and thus the network controller 678 including the centralized reachability and forwarding information module 679, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 7 illustrates, a general purpose control plane device 704 including hardware 740 comprising a set of one or more processor(s) 742 (which are often COTS processors) and network interface controller(s) 744 (NICs; also known as network interface cards) (which include physical NIs 746), as well as non-transitory machine readable storage media 748 having stored therein centralized control plane (CCP) software 750.

In embodiments that use compute virtualization, the processor(s) 742 typically execute software to instantiate a hypervisor 754 (sometimes referred to as a virtual machine monitor (VMM)) and one or more virtual machines 762A-R that are run by the hypervisor 754; which are collectively referred to as software instance(s) 752. A virtual machine is a software implementation of a physical machine that runs programs as if they were executing on a physical, non-virtualized machine; and applications generally are not aware they are running on a virtual machine as opposed to running on a "bare metal" host electronic device, though some systems provide para-virtualization which allows an operating system or application to be aware of the presence of virtualization for optimization purposes. Again, in embodiments where compute virtualization is used, during operation an instance of the CCP software 750 (illustrated as CCP instance 776A) on top of an operating system 764A are typically executed within the virtual machine 762A. In embodiments where compute virtualization is not used, the CCP instance 776A on top of operating system 764A is executed on the "bare metal" general purpose control plane device 704.

The operating system 764A provides basic processing, input/output (I/O), and networking capabilities. In some embodiments, the CCP instance 776A includes a network controller instance 778. The network controller instance 778 includes a centralized reachability and forwarding information module instance 779 (which is a middleware layer providing the context of the network controller 778 to the operating system 764A and communicating with the various NEs), and an CCP application layer 780 (sometimes referred to as an application layer) over the middleware layer (providing the intelligence required for various network operations such as protocols, network situational awareness, and user—interfaces). At a more abstract level, this CCP application layer 780 within the centralized control plane 776 works with virtual network view(s) (logical view(s) of the network) and the middleware layer provides the conversion from the virtual networks to the physical view. The CCP application can encompass the functionality of the SPBL module 781 as described herein above.

The centralized control plane 776 transmits relevant messages to the data plane 680 based on CCP application layer 780 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 680 may receive different messages, and thus different forwarding information. The data plane 680 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

Those skilled in the art will appreciate that the use of the term "exemplary" is used herein to mean "illustrative," or "serving as an example," and is not intended to imply that a particular embodiment is preferred over another or that a particular feature is essential. Likewise, the terms "first" and "second," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

Of course, the present invention may be carried out in other specific ways than those herein set forth without departing from the scope and essential characteristics of the invention. One or more of the specific processes discussed above may be carried out using one or more appropriately configured processing circuits. In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

The invention claimed is:

1. A method implemented by a node for enabling shortest path bridging in a network that is scalable to support sixteen million virtual local area network (VLAN) identifiers using multiprotocol label switching (MPLS) encapsulation, the method comprising the steps of:
    allocating at least one tunnel label for a tunnel between the node and another node in the network, the allocating using a distributed tunnel label allocation algorithm;
    allocating a source label for identifying the node in the network using a distributed source label allocation algorithm;
    assigning a bridge instance hosted by the node a service label;
    distributing the tunnel label, source label and service label to other nodes in the MPLS network; and
    assigning a locally unique service label to each bridge instance on the node,
    wherein distributing the tunnel label, source label and service label is performed using one or more of an intermediate system—intermediate system (IS-IS) and label distribution protocol (LDP) to advertise the tunnel label, the source label and the service label;
    wherein the tunnel labels are utilized to identify a path across the MPLS network between two nodes hosting bridge instances that are a part of the SPBL topology;
    source labels are utilized to identify the source node for learning and preventing loop backs; and
    service labels are utilized to identify specific external services or service providers reachable through a given bridge instance.

2. The method of claim 1, further comprising:
    determining a destination bridge in the MPLS network for a data packet;
    generating an MPLS encapsulated data packet;
    adding a source label for the source bridge in the MPLS network to the MPLS encapsulated data packet;
    adding a service label identifying a destination bridge in the MPLS network to the MPLS encapsulated data packet;
    adding a tunnel label identifying a tunnel from the source bridge to the destination bridge in the MPLS encapsulated data packet; and
    forwarding the MPLS encapsulated data packets to the tunnel interface of the tunnel identified by the tunnel label.

3. The method of claim 1, wherein allocating a tunnel label comprises:
    allocating a tunnel label for a multicast group.

4. A network device functioning as a node implementing a method for enabling shortest path bridging in a network that is scalable to support sixteen million virtual local area network (VLAN) identifiers using multiprotocol label swapping (MPLS) encapsulation, the network device comprising:
    a non-transitory computer-readable medium having stored therein a shortest path bridging label mode (SPBL) module; and
    a processor coupled to the non-transitory computer-readable medium, the processor configured to execute the SPBL module, the SPBL module configured to allocate at least one tunnel label for a tunnel between the node and another node in the network using a distributed tunnel label allocation algorithm, to allocate a source label for identifying the node in the network using a distributed source label allocation algorithm, to assign a bridge instance hosted by the node a service label, to distribute the tunnel label, source label and service label to other nodes in the MPLS network, to assign a locally unique service label to each bridge instance on the node, distribute the tunnel label, source label and service label by using an intermediate system—intermediate system (IS-IS) and a label distribution protocol (LDP) to advertise the tunnel label, the source label and the service label;
    wherein the tunnel labels are utilized to identify a path across the MPLS network between two nodes hosting bridge instances that are a part of the SPBL topology;
    source labels are utilized to identify the source node for learning and preventing loop backs; and
    service labels are utilized to identify specific external services or service providers reachable through a given bridge instance.

5. The network device of claim 4, wherein the SPBL module is further configured to determine a destination bridge in the MPLS network for a data packet, to generate an MPLS encapsulated data packet, to add a source label for the source bridge in the MPLS network to the MPLS encapsulated data packet, to add a service label identifying a destination bridge in the MPLS network to the MPLS encapsulated data packet, to add a tunnel label identifying a tunnel from the source bridge to the destination bridge in the MPLS encapsulated data packet, and to forward the MPLS encapsulated data packets to the tunnel interface of the tunnel identified by the tunnel label.

6. The network device of claim 4, wherein the SBPL module is further configured to allocate a tunnel label comprises allocating a tunnel label for a multicast group.

7. A computing device functioning as a node of a network domain, the computing device to execute a plurality of virtual machines for implementing network function virtualization (NFV), wherein a virtual machine from the plurality of virtual machines is configured to implement a method for enabling shortest path bridging in a network that is scalable to support sixteen million virtual local area network (VLAN) identifiers using multiprotocol label swapping (MPLS) encapsulation, the computing device comprising:
  a non-transitory computer-readable medium having stored therein a shortest path bridging label mode (SPBL) module; and
  a processor coupled to the non-transitory computer-readable medium, the processor configured to execute the virtual machine, the virtual machine configured to execute the SPBL module, the SPBL module configured to allocate at least one tunnel label for a tunnel between the node and another node in the network using a distributed tunnel label allocation algorithm, to allocate a source label for identifying the node in the network using a distributed source label allocation algorithm, to assign a bridge instance hosted by the node service label, to distribute the tunnel label, source label and service label to other nodes in the MPLS network, and to assign a locally unique service label to each bridge instance on the node, wherein the SBPL module is further configured to distribute the tunnel label, source label and service label by using intermediate system—intermediate system (IS-IS) and a label distribution protocol (LDP) to advertise the tunnel label, the source label and the service label;
  wherein the tunnel labels are utilized to identify a path across the MPLS network between two nodes hosting bridge instances that are a part of the SPBL topology;
  source labels are utilized to identify the source node for learning and preventing loop backs; and
  service labels are utilized to identify specific external services or service providers reachable through a given bridge instance.

8. The computing device of claim 7, wherein the SPBL module is further configured to determine a destination bridge in the MPLS network for a data packet, to generate an MPLS encapsulated data packet, to add a source label for the source bridge in the MPLS network to the MPLS encapsulated data packet, to add a service label identifying a destination bridge in the MPLS network to the MPLS encapsulated data packet, to add a tunnel label identifying a tunnel from the source bridge to the destination bridge in the MPLS encapsulated data packet, and to forward the MPLS encapsulated data packets to the tunnel interface of the tunnel identified by the tunnel label.

9. The computing device of claim 7, wherein the SBPL module is further configured to allocate a tunnel label comprises allocating a tunnel label for a multicast group.

10. A control plane device is configured to implement a control plane of a software defined networking (SDN) network including a plurality of network devices implementing the method for enabling shortest path bridging in a network that is scalable to support sixteen million virtual local area network (VLAN) identifiers using multiprotocol label swapping (MPLS) encapsulation, the control plane device comprising:
  a non-transitory computer-readable medium having stored therein a shortest path bridging label mode (SPBL) module; and
  a processor coupled to the non-transitory computer-readable medium, the processor is configured to the SPBL module, the SPBL module is configured to allocate a tunnel label for a tunnel between a node and another node in the network using a distributed tunnel label allocation algorithm, to allocate a source label for identifying the node in the network using a distributed source label allocation algorithm, to assign a bridge instance hosted by the node a service label, and to distribute the tunnel label, source label and service label to other nodes in the MPLS network;
  wherein the SBPL module is further configured to distribute the tunnel label, source label and service label by using intermediate system—intermediate system (IS-IS) and a label distribution protocol (LDP) to advertise the tunnel label, the source label and the service label;
  wherein the tunnel labels are utilized to identify a path across the MPLS network between two nodes hosting bridge instances that are a part of the SPBL topology;
  source labels are utilized to identify the source node for learning and preventing loop backs; and
  service labels are utilized to identify specific external services or service providers reachable through a given bridge instance.

11. The control plane device of claim 10, wherein the SPBL module is further configured to determine a destination bridge in the MPLS network for a data packet, to generate an MPLS encapsulated data packet, to add a source label for the source bridge in the MPLS network to the MPLS encapsulated data packet, to add a service label identifying a destination bridge in the MPLS network to the MPLS encapsulated data packet, to add a tunnel label identifying a tunnel from the source bridge to the destination bridge in the MPLS encapsulated data packet, and to forward the MPLS encapsulated data packets to the tunnel interface of the tunnel identified by the tunnel label.

12. The control plane device of claim 10, wherein the SBPL module is further configured to allocate a tunnel label comprises allocating a tunnel label for a multicast group.

13. The control plane device of claim 10, wherein the SBPL module is further configured to assign a locally unique service label to each bridge instance on the node.

\* \* \* \* \*